COMMUNICATION SYSTEM HAVING A MULTIPLE ACCESS MAN-MADE SATELITE

Original Filed Aug. 4, 1967

INVENTORS

GERARD P. BATTAIL
PIERRE C. BROSSARD

BY Hughes, Rothwell, Muir, Zinn & Macpeak

ATTORNEYS

United States Patent Office

Re. 27,478
Reissued Sept. 19, 1972

27,478

COMMUNICATION SYSTEM HAVING A MULTIPLE ACCESS MAN-MADE SATELLITE

Gerard Pierre Battail, Paris, and Pierre Claude Brossard, Montigny-le-Bretonneux, France, assignors to Communications Satellite Corporation Original No. 3,470,477, dated Sept. 30, 1969, Ser. No. 658,565, Aug. 4, 1967. Application for reissue Feb. 11, 1971, Ser. No. 114,453
Claims priority, application France, Aug. 5, 1966, 72,249
Int. Cl. H04b *1/06*
U.S. Cl. 325—304 6 Claims

Matter enclosed in heavy brackets [ ] appears in the original patent but forms no part of this reissue specification; matter printed in italics indicates the additions made by reissue.

ABSTRACT OF THE DISCLOSURE

A communications receiver which receives F.M. communications from a plurality of transmitters but detects information only from that transmitter which modulates the carrier with an address frequency assigned to the receiver. A frequency deviation feedback loop connected between the output and input of the receiver mixer generates a local carrier frequency which differs from the received carriers by the center frequency of an improved demodulation and which is modulated by the address signal assigned to the receiver. A phase lock loop and an amplitude lock loop in the feedback path operate to control the phase and amplitude of the locally generated address signal so that the mixing of the F.M. modulated locally generated carrier and the received signals results in an intermediate frequency output which is frequency modulated by the desired information only. All of the received carriers which have been modulated by different address signals will come out of the mixer as intermediate frequencies modulated by a combination of signals. Only the desired information signal then is capable of passing through the improved demodulator.

Prior art

The closest prior art known is French Patent No. 1,438,315, filed in the names of Gerard Battail and Pierre Brossard on Feb. 27, 1965 and issued on Apr. 4, 1966. The French patent describes the overall environment in which the receiver of the present invention is useful and also describes a prior art receiver. In the overall communications environment, the transmitters are identified by individual address frequencies which are combined with the information signal prior to modulating an F.M. carrier. All of the transmitters use the same carrier. The receivers must be adapted to detect the information which has been combined with the address signal assigned to the receiver and to reject all other information.

Discrimination is accomplished in the receiver by mixing all incoming carriers with a signal that is frequency modulated with the assigned address frequency signal and which is closely related in phase and amplitude to the received address of interest. As a result, the communication of interest appears at the mixer output as an intermediate frequency modulated by the information alone. All other communications appear as intermediate frequencies modulated by a combination of information, transmitter address signal and local receiver address signal. Because of the relationship of address frequencies, the communication of interest will have the lowest rate of frequency deviation.

The mixer output is then passed through a demodulator known in the prior art as an improved demodulator. An improved demodulator, such as described in French Patent No. 1,328,367, differs from an ordinary demodulator in that it demodulates only inputs having a frequency rate of change below a preset maximum. Since all but the communication of interest will have a frequency rate of change above the preset maximum, the output of the improved demodulator will be the information from the transmitter having the same address as that of the receiver.

In the receiver of the prior art patent, mentioned above, the address signal mixed with the incoming information is derived by a feedback loop containing a local oscillator, a frequency modulator and a filter. The filter, which must be a high resolution filter, is tuned to the address frequency and is placed at the output of the improved demodulator. Only the address passes through the filter and it is used, after amplification, to frequency modulate a locally generated carrier. The locally generated carrier is chosen so that it differs from the received carriers by an amount equal to the center frequency of the improved demodulator. The direction of the instantaneous frequency change of the F.M. modulated locally generated carrier is such that the frequency deviations of the incoming signals and local oscillator signal are deducted from one another when mixed.

In the prior art receiver, the feedback path was very difficult to implement due to the stability requirements on feedback devices. The requirements place a limit of about 6 db/octave on the change of attenuation of the filter used versus frequency. On the one hand, the gain of the amplifier in the feedback loop should be large enough to reduce to a negligible value the frequency deviation associated with the address signal assigned to the receiver. A gain of about 50 to 60 db is needed. On the other hand, the feedback should be insignificant for the wanted signals and for the address signals other than the address signal identifying the receiver. The band-pass filter, which separates the receiver address signal, should therefore strongly attenuate the other signals. The required selectivity of a simple resistance circuit used as filter is thus considerable and consequently its figure-of-merit should be very high. For instance, the figure-of-merit should exceed 1,000, a value very difficult to achieve in practice with conventional means.

Another disadvantage of the prior art is that it is necessary to have a frequency deviation different for each address in order to prevent the rate of change of frequency of the unwanted communications from being within the acceptable limits of the improved demodulator. Also, in the prior art receiver, the address signal used to modulate the locally generated carrier is extracted from the output of the improved demodulator, which is not particularly adapted to demodulating the address signal and thus results in an address which is attenuated and distorted. Additionally, since the address in the prior art system is extracted by a filter, the overall communication system must not include addresses which are harmonically related.

The disadvantages of the receiver of the prior art are overcome by the present invention in which the local address signal, instead of being extracted by filtering from the demodulated signal, is generated locally in the receiver by means of an address signal generator. By comparing the phase of the signal of a local address signal generator to that of the demodulated address signal, an error signal is obtained which permits the synchronization of the local signal with the address signal modulating the incoming wave. By comparing the amplitudes of the same signals, it is possible to adjust the amplitude of a local address signal. Since the transmitted frequency deviation and, consequently, the necessary amplitude are known in advance, the adjustment of the local address signal amplitude is only for a small proportion of the total amplitude. By adjusting the phase and amplitude of the local address signal, it is possible to cancel with a very good approximation the changes of the incoming signal's instantaneous frequency, caused by the address signal, at the input to the improved demodulator of each receiver in the communication system.

The phase error signal can be obtained in a receiver of the invention by synchronously demodulating the signal coming from the feedback demodulator included in the frequency deviation feedback loop with respect to a signal derived from the local address signal by time staggering equal to one fourth the local signal period. The signal resulting from this demodulation is proportional to the sin of $\varphi$ ($\varphi$ is the phase angle between the address signal modulating the incoming wave, and the local address signal). Consequently, within a range equal to $\pi$ radians, the error signal has the required sign to produce the wanted feedback. It should be noted that this error signal does not in practice depend on the address signal amplitude which varies only within narrow limits.

The amplitude error signal can be obtained by synchronously demodulating the signal coming from the frequency demodulator included in the frequency deviation feedback loop, with respect to the very signal delivered by the local address signal generator. When the synchronization of the received and local address signals is achieved, the product of the demodulation considered is proportional to the algebraic difference between their amplitudes. Thus, this product can be used to adjust the local address signal amplitude.

The phase and amplitude error signals includes a continuous component and very low frequency components; therefore, they should be filtered, with the desired selectivity, by narrow band low-pass filtering. Such a filter is easy to implement by means of an RC circuit which is known to satisfy stability requirements. Only the identity of the waveforms of the address signals transmitted by the transmitting stations and of the local address signals of the receiving stations is required for the proper operation of the generator of the error signal. This requirement does not limit the invention to the exclusive use of sinusoidal address signals. The desirability of removing the limitation to sinusoidal signals will be described hereafter.

The invention will be better understood following the detailed description below, giving in conjunction with the drawings.

Figures 1, 2, 3:
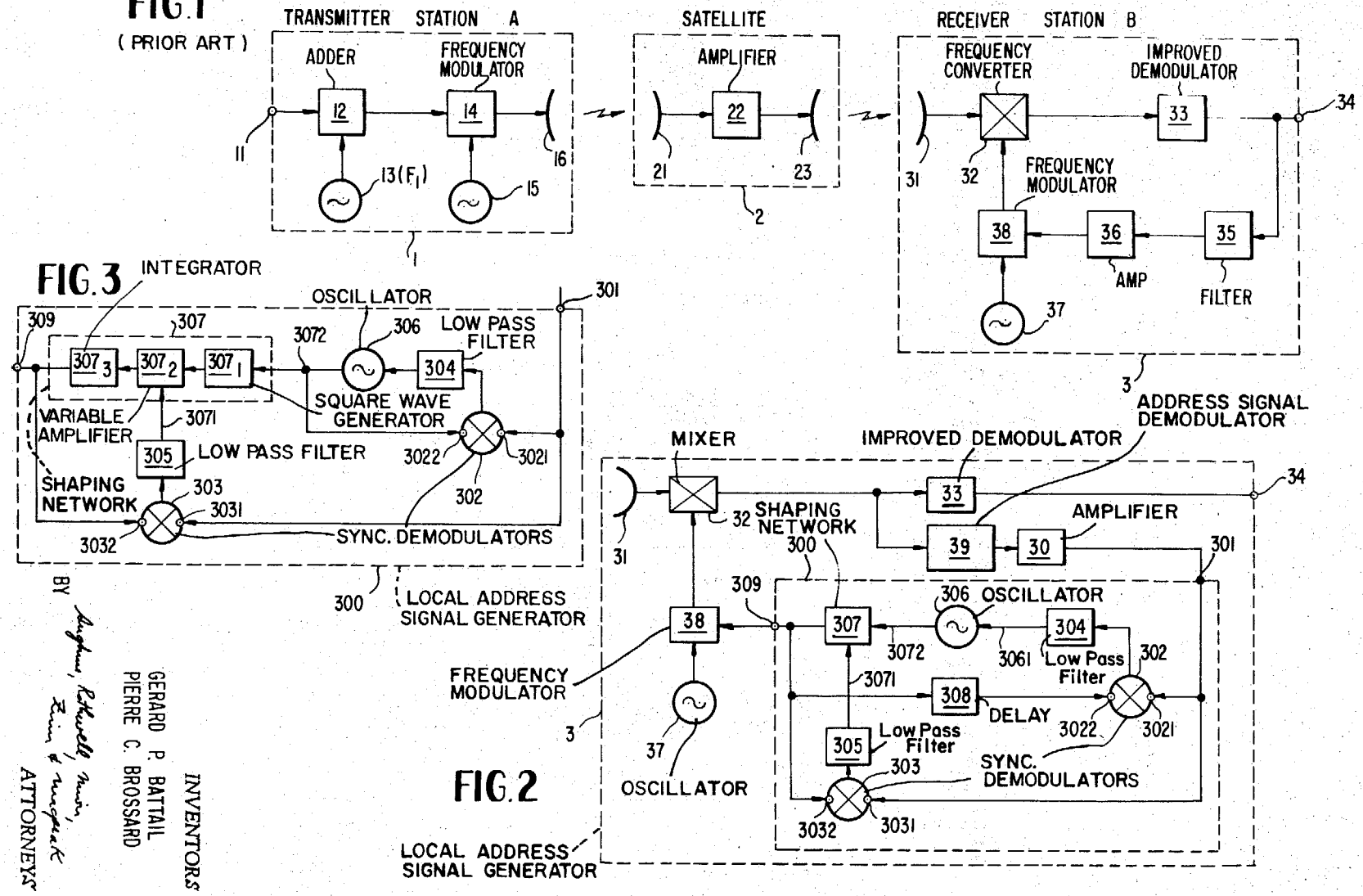
FIG. 1 (PRIOR ART)
FIGURE 1 shows the communication system with a prior art receiver.
FIGURE 2 shows a preferred embodiment of a receiver of the present invention.
FIGURE 3 shows an alternate embodiment of the receiver.

FIGURE 1 shows one of the links which satellite 2 can provide, consistent with the system of the prior art. This link connects transmitter 1 at station A with receiver 3 at station B.

The information signal to be transmitted is applied to input 11 of transmitter 1 and is added in conventional adder 12 to the sinusoidal address signal of frequency $F_1$ generated by oscillator 13. The sum of the two signals frequency modulates, by means of modulator 14, the carrier wave generated by oscillator 15. Antenna 16 radiates the signal thus obtained towards satellite 2. The transmitted signal is received by antenna 21 on the satellite, amplified by amplifier 22, carrier-frequency changed, and then radiated by antenna 23 towards receiving station 3.

The signal is recieved at station 3 by antenna 31 which is connected to the input of frequency mixer 32. The output of mixer 32 is connected to improved demodulator 33; this demodulator output is connected, on one hand, to output terminal 34 of receiver 3 and, on the other, to the input to filter 35. Filter 35 is a band-pass filter and its passband is centered on frequency $F_1$. Since the passband is very narrow, only signals of frequencies adjacent to $F_1$ are transmitted without any noticeable attenuation. The band width is defined by the changes of frequency $F_1$ due to the drift or the instability of oscillator 13 and to the Doppler-Fizeau effect resulting from the movement of satellite 2.

The signal coming out of filter 35, after amplification in amplifier 36, frequency modulates in modulator 38 the wave generated by local oscillator 37. The modulation product produced by modulator 38 is applied to the second input to mixer 32. The frequency of local oscillator 37 is different from the carrier frequency common to the various signals applied to the first input to mixer 32; the center frequency of the signal coming from mixer 32 is selected, for instance, as the difference between the carrier frequency of the waves received at the first input to mixer 32, and the frequency of local oscillator 37.

The center frequency of improved demodulator 33 is equal to the above difference, and the improved demodulator parameters are chosen so that the demodulator can demodulate under the most favorable conditions the communication signal associated with the address signal of frequency $F_1$. The frequency deviation of the wave coming from mixer 32 is equal to the difference between the frequency deviation of the wave received at the first input to this mixer and the frequency deviation of the wave coming from modulator 38.

As a result, the frequency deviation of the signal applied to the input to improved demodulator 33 includes only a negligible component at frequency $F_1$, whereas, the communication signal there remains unchanged. This signal is thus normally demodulated by improved demodulator 33 and appears at output terminal 34 or receiver 3.

In FIGURE 2 the components common to the receiving device of the invention and to the receiver of FIGURE 1 are designed by the same reference number. The signal transmitted by satellite 2 (FIGURE 1) is received by antenna 31 of receiver 3. It is then applied to one of the inputs to mixer 32.

This mixer output is connected to improved demodulator 33 whose output is connected to output terminal 34 of receiver 3. The mixer output is also connected to address signal demodulator 39 which may be a conventional demodulator made up of a limiter and discriminator, operating in a frequency band large enough to demodulate, without excessive distortion, the address signal assigned to receiver 3. The requirements relative to this demodulator should be satisfied when the feedback device is operating, i.e., when the modulation index, relative to the address signal, is greatly reduced.

The output of the address signal demodulator 39 drives amplifier 30; the output of this amplifier is connected to input 301 of device 300, which will be caller "local address signal generator" in the subsequent paragraphs.

Input 301 of generator 300 is connected in parallel to input terminals 3021 and 3031 of synchronous demodulators 302 and 303, which may be conventional "ring modulators."

The demodulators 302 and 303 include respectively "modulating" signal inputs 3021 and 3031 receiving a low-level signal and "carrier" signal inputs 3022 and 3032 receiving a high-level carrier. The modulated signals coming out of synchronous demodulators 302 and 303 pass through low-pass type filters 304 and 305. The signal coming out of filter 304 is applied to controlling terminal 3061 of controlled oscillator 306. The signal coming out of filter 305 is applied to input terminal 3071 of shaping network 307 which receives at its second input terminal 3072 the incoming signal from controlled oscillator 306. Oscillator 306 generates a sinusoidal signal of frequency varying as the voltage applied to its controlling input 3061. In the absence of this controlling voltage, this frequency is very close to the frequency of the address signal to which receiver 3 is adapted.

Shaping network 307 operates to transform the variable frequency sinusoidal signal of oscillator 306 into a signal of the waveform chosen for the address signals and to adjust the amplitude of the signal transmitted by it in accordance with the controlling voltage applied to its input 3071. In the absence of a controlling voltage the amplitude of the signal coming out of network 307 is very near that of the signal to which receiver 3 is adapted.

The output of shaping network 307 is applied to output 309 of local address signal generator 300. This output is connected to the input of frequency demodulator 38 so that the address signal of network 307 can frequency modulate the wave generated by local oscillator 37.

The output of 307 is also connected to the input of "delaying" network 308 which delays the address signal by a time equal to one-fourth its period. The output of delaying network 308 is connected to carrier signal access 3022 of synchronous demodulator 302. The output of 307 is also connected to the input 3032 of synchronous demodulator 303.

The wave generated by local oscillator 37, after frequency modulation by modulator 38, is applied to the second input to mixer 32. It is assumed that the wave from local oscillator 37 is of a frequency different from the carrier frequency common to the various signals applied to the first input of mixer 32; the signals from mixer 32 have a center frequency which may be equal to the difference between the carrier frequency of the signals received at the first input to mixer 32 and the frequency of local oscillator 37. The common center frequency of the signals applied to the inputs to improved demodulator 33 and address demodulator 39, is then equal to this difference. The frequency deviation of the wave out of mixer 32 is equal to the difference between the frequency deviation of the wave received at the first input to mixer 32 and that of the wave out of modulator 38. Since the address signal's frequency deviation is known in advance, the amplitude of the signal out of shaping network 307 can, as a result, be determined in advance with accuracy. Thus, it can be first assumed that these two amplitudes are exactly equal and, that the fundamental component of these signals has a peak amplitude equal of unity.

The received address signal, modulating the incoming signal, has a fundamental component equal to $$\cos(2\pi f_a t)$$

where $f_a$ is the address frequency and the signal from shaping network 307 has a fundamental component equal to $\cos(2\pi f_a t+\varphi)$. As a result of the mixing, the intermediate frequency output of mixer 32 is frequency modulated by the compound, $\cos(2\pi f_a t)-\cos(2\pi f_a t+\varphi)$.

Since the signal from shaping network 307 is delayed one-fourth of a period by delaying network 308, the signal applied to input 3022 of synchronous demodulator 302 has $\sin(2\pi f_a t+\varphi)$ as its fundamental. The product of the synchronous demodulation of the signal out of amplifier 30, with respect to the signal from delaying network 308 is thus of the form, $$\sin(2\pi f_a t+\varphi)[\cos(2\pi f_a t)-\cos(2\pi f_a t+\varphi)]$$

which equals $$\tfrac{1}{2}[\sin(4\pi f_a t+\varphi)+\sin\varphi-\sin 2(2\pi f_a t+\varphi)]$$

The terms $\sin(4\pi f_a t+\varphi)$ and $\sin 2(2\pi f_a t+\varphi)$ with a frequency adjacent to $2f_a$ are removed by filter 304.

However, since the frequency of controlled oscillator 306 is very near the address frequency and since, as a result, $\varphi$ varies slowly in terms of time, the term ($\frac{1}{2}\sin\varphi$) remains after filtering through filter 304, and the signal coming from this filter 304 is thus an error signal which is used to control, through input 3061, the phase of controlled oscillator 306. The term ($\frac{1}{2}\sin\varphi$) is cancelled when the difference between the phases of the address signals received and generated locally by controlled oscillator 306 and shaping network 307 is equal to zero.

It should be noted that the operation of the system consisting of oscillator 306, shaping network 307, synchronous demodulator 302, and filter 304 is comparable to that of a receiver "phase-locked" on the address signal modulating the incoming wave; a number of articles were written on phase-locked receivers, in particular an article by R. Taffe and E. Rechtin entitled "Design and Performance of Phase-Lock Circuits Capable of Near Optimum Performance over a Wide Range of Input Signal and Noise Levels," published in I.R.E. Transactions on Information Theory, vol. 1, No. 1, Mar. 1966, pages 66–76. It should also be noted that the phase adjustment does not depend on the amplitudes of the received and locally generated address signals.

The adjusting of the amplitude of the signal from shaping network 307 will now be explained, assuming that angle $\varphi$ is now approximately zero, i.e., assuming that the phase of controlled oscillator 306 is properly adjusted as specified above.

If $a_1$ is the amplitude of the received address signal modulating the incoming signal and $a_2$ is the amplitude of the signal from shaping network 307, then the modulating signal at the output of mixer 32 is equal to $(a_1-a_2)\cos 2\pi f_a t$. The amplified signal is applied to input 3031 of synchronous demodulator 303. Since the signal applied to the other input 3032 to the same demodulator 303 is phased with the signal present at input 3031, an amplitude signal results at the output of filter 305, proportional to $(a_2-a_1)$, which is used as an error signal to adjust $a_2$. For that purpose, it is applied to controlling input 3071 to shaping network 307.

Although the address signal waveform was not specified in the general description of the prior art invention discussed above, the system devices were described with the assumption that the address signals were sinusoidal, inasmuch as it is easy to obtain these waveforms and also inasmuch as it is expected that selective feedback devices can be easily implemented for an unmodulated signal. No theoretical consideration was involved in this choice.

The experience gained while proceeding with the tests on the invention's communication system showed that the choice of a sinusoidal waveform for the address signals was not particularly favorable. Actually, this choice implies that different frequency-deviations should be associated with different address signals, so that the rate of change of the instantaneous frequency of the signal applied to the input to the improved demodulator of a receiver, generated by a modulated signal having an address signal other than the address signal to which the receiver is adapted, is larger than a prescribed minimum, to be chosen to limit the interference of this signal to the demodulation of the wanted signal.

Spacing between the frequency-deviations associated with adjacent sinusoidal address frequencies is necessary; as a result, the frequency band occupied by the aggregate signals in the system is considerable, as compared to the band occupied by a communication system of similar performance, using frequency modulation of staggered carriers, so that the spectra of the individual modulated signals are practically separated. One of the major reasons for using sinusoidal address signals, i.e., the apparent ease in realizing the necessary receivers was, however, proven by experience not to be valid, as previously indicated. Non-sinusoidal address signals can be used in the frequency-deviation feedback device of the invention, and the particular desirability of address signals of isosceles triangular waveforms will be shown later.

An isosceles triangular waveform comprises a periodic alternating signal having an average value of zero, with an angular point at each half-period, such that the absolute value of its slope (the time derivative of the value of the signal) is constant and alternatively positive and negative between these points. As previously indicated, the specific nature of the address signals with respect to the communication signals consists in providing much faster rates of change of the instantaneous frequency. Thus, it is reasonable to use as address signals constant slope waveforms in order to produce a fixed rate of change of the instantaneous frequency. All address signals may then have the same $\Delta Fa$ frequency-deviation.

If harmonics of the fundamental frequency fa are assumed as the address frequency, the rate of change of the instantaneous frequency of the address signals respectively applied to the inputs to the improved demodulators of the receivers is continually equal to $4fa \cdot \Delta Fa$ or to a multiple of this value.

It should be noted that the invention permits the utilization of a given frequency and its harmonics, while the device described in the prior art does not. Of course, these harmonics should be chosen above the useful frequency band for the communication signals. In addition, the values for the fundamental frequency fa and the frequency-deviation $\Delta Fa$ should be chosen sufficiently large for the product $4fa \cdot \Delta Fa$ to be equal to the required minimum. Let K be the highest rank of the harmonics of fundamental frequency fa used as address signals; to avoid having the total occupied band much larger than $\Delta Fa$ (e.g., Kfa may be of the order of $\Delta Fa/10$), harmonic Kfa should remain relatively low with respect to $\Delta Fa$. However, fa and $\Delta Fa$ can be chosen such as to minimize the band occupied by the communication system signals.

The choice of address frequencies can be based on the following considerations. Let $f_1, f_2 \ldots f_i, f_j \ldots f_n$ be the values for the various address frequencies. When the various signals are transmitted by the transmitters of the communication system with carrier frequencies strictly equal, the intermodulation between these various signals, in the absence of modulation by the communication signals, produces, after demodulation, spurious signals of frequencies expressed as follows:

$$f = n_1 f_1 + n_2 f_2 + \ldots n_i f_i \quad n_j f_j + \ldots + n_N f_N$$

where $n_1, n_2 \ldots n_i, n_j$ are any positive or negative integers or zero.

If frequencies $f_1, f_2 \ldots, f_N$ are any frequencies such that the difference between two successive frequencies remains larger than the upper limit of the useful band, it is possible to find a combination of numbers $n_1, n_2 \ldots n_N$ such that intermodulation frequency f is within the useful band, considering that such combinations are very numerous.

If, on the contrary, the address frequencies are selected among a harmonic series of the form:

$$f_i = K_i fa$$

$K_1, K_2, \ldots K_i, \ldots K_N$ being positive integers, the intermodulation product frequencies become:

$$f = (n_1 K_1 + n_2 K_2 + \ldots n_i K_i + \ldots + n_N K_N) fa$$

For none of these intermodulation products to be within the useful band, in the absence of modulation, it is sufficient that fundamental frequency fa be larger than the upper limit of the useful band width.

In the presence of modulation by communication signals, the intermodulation products no longer consist of discreet spectral lines; instead, their frequency spectrum is a spread spectrum. However, this spectrum is centered on the spectral lines obtained in the absence of modulation.

The intermodulation power in the useful band can be reduced to a negligible value by selection of a fundamental frequency fa well above the upper limit of the useful band; only the intermodulation power related to the zero frequency term is within the useful band. If the chosen harmonics are high enough, i.e., if term $K_1$ relative to the lowest rank harmonic is equal at least to two or three, the intermodulation power of the zero frequency term is negligible. In the device of the prior art, the use of harmonic address frequencies is not possible inasmuch as a system receiver could mistake an address frequency harmonic of a lower rank for its own address frequency.

It now remains to be shown that in implementing the necessary receivers of the invention, harmonic address frequencies can be chosen with no interference to the receiver synchronization. As previously mentioned, the error signals for the accurate phase and amplitude adjustment of address signals from the local generator are obtained in the invention's device as follows:

For the amplitude error signal: by synchronous demodulation of the signal from the frequency demodulator of this device with respect to the local address signal itself;

For the phase error signal: by synchronous demodulation of the same signal, with respect to the same local address signal, but time staggered by one-fourth of its period.

This synchronous demodulation can be obtained by means of a balanced modulator such as a conventional ring modulator, for instance, where the signal, called "carrier signal," in relation to which the modulation is performed, makes the diodes alternatively conducting and non-conducting; it is as if the modulated signal were multiplied by a periodic series of a frequency equal to the signal frequency, capable of only assuming, in time, values of $-1$ and $+1$ (square carrier signal). This synchronous demodulation is, of course, realized by low-pass filtering.

If the signal to be demodulated is periodic, but not sinusoidal, the product of its even harmonics times the square carrier signal has an average value of zero; the same does not hold true in respect to the average for odd harmonics. As a result, these odd harmonics perturb the receiver synchronization. Therefore, it is possible to use harmonic address frequencies, provided they make up an incomplete series of harmonics, such that no address frequency is an odd harmonic of another. As an example, the harmonics of such a series of the order:

3, 4, 5, 6, . . . 23, etc., can be used as address frequencies.

In the specific case when the isosceles triangular waveform is chosen for the address signals, local address signal generator 300 can be designed more simply. This design is shown in FIGURE 3. The components common to both generators in FIGURE 2 and FIGURE 3 are designated by the same reference numbers. Input 301 to local address signal generator 300 of FIGURE 3 is connected in parallel to signal inputs 3021 and 3031 of synchronous demodulators 302 and 303. The output of demodulator 302 is connected to the input to low-pass type filter 304, whose output is connected to controlled oscillator 306.

The output of oscillator 306 is connected to input 3022 of synchronous demodulator 302 and to the input of shaping network 307. The shaping network 307 consists of a conventional type square wave shaping generator $\mathbf{307_1}$, a variable gain amplifier $\mathbf{307_2}$, whose gain varies according to the voltage applied to its controlling input 307, and a conventional type integrator $\mathbf{307_3}$ whose output 309 is that of shaping network 307. The output 309 is connected to the output terminal of local address generator 300 and to input 3032 of synchronous demodulator 303, whose output is connected to low-pass type filter 305. The output of filter 305 is connected to controlling terminal 3071 of amplifier $\mathbf{307_2}$ of shaping network 307.

The emplitude adjustment of the signals delivered by local address signal generator 300 is based on the change of gain of variable gain amplifier $\mathbf{307_2}$. The controlling voltage applied to controlling terminal $307_1$ causes the amplitude of the incoming signal from shaping network 307 to vary. The connections between controlled oscillator 306, shaping network 307, synchronous demodulator 303, and low-pass filter 305 are identical to those between their corresponding devices in FIGURE 2, and the operating process is the same.

With respect to adjusting the phase of this alternative to local address signal generator 300, the one-fourth period delay, between the zero-crossings of the signals entering and coming from shaping network 307, makes delaying network 308 (FIGURE 2) unnecessary. This network can thus be eliminated and the signals generated by controlled oscillator 306 can be applied to carrier input 3022 of synchronous demodulator 302.

Another advantage of the frequency-deviation feedback device covered by the invention is the ease with which the device's locking requirements are implemented. It is sufficient to select, in the absence of controlling voltage, a value for the local generator's own frequency of address frequency, slightly different from that of the corresponding generators included in the communication system transmitters, to achieve a short-term variation of the phase difference between the local address signal and the received address signal, before the invention's feedback device is locked in phase on the received address signal. Thus, the phase difference has at a given time a value which is within the range in which the feedback becomes effective and, therefore, the locking can occur. Also, the addition of significant noise, resulting from the large band width under normal operating conditions, has little significance since the correcting signal derived from the address signal demodulated by synchronous demodulation with respect to the address signal generated locally is passed through a very narrow band filter before being used.

While the invention has been particularly shown and described with reference to preferred embodiments thereof, it will be understood by those in the art that the foregoing and other changes in form and details may be made therein without departing from the spirit and scope of the invention.

What is claimed is:

1. In a communication receiver adapted to receive F.M. signals modulated by information and address signals and to detect only information associated with an assigned address, said receiver being of the type which includes an improved F.M. demodulator and a mixer connected between the receiving end of the receiver and the input to the improved demodulator, the combination comprising, (a) extracting means connected to said mixer for extracting the assigned address signal from said mixer output, (b) a voltage controlled variable address frequency oscillator means for generating a local address frequency signal, (c) phase error means responsive to said local address frequency signal and the output of said extracting means for providing a phase error signal, said phase error signal being connected to the control input of said variable address frequency oscillator means, said phase error means being connected to the outputs of said extractor means and said variable address frequency oscillator means, (d) wave shaping means connected to the output of said variable address frequency oscillator means and having an amplitude controlling input for wave shaping and amplitude controlling said local address frequency signal, (e) amplitude error means responsive to the output of said wave shaping means and the output of said extracting means for providing an amplitude error signal which is connected to said amplitude controlling input, of said wave shaping means, said amplitude error means being connected to the output of said wave shaping means and said extracting means, (f) a local oscillator means for generating a local carrier signal, and (g) an F.M. modulator means having inputs connected to the outputs of said local oscillator means and said wave shaping circuit means for frequency modulating said local carrier signal with the output from said wave shaping circuit, the output of said F.M. modulator being connected to said mixer.

2. The combination as claimed in claim 1 wherein said extracting means comprises an F.M. demodulator in series with a filter centered on the frequency of the assigned address signal.

3. The combination as claimed in claim 2 wherein said amplitude error means comprises a synchronous demodulator and a low-pass filter connected to the output of said synchronous demodulator.

4. The combination as claimed in claim 2 wherein said phase error means comprises, means for delaying the phase of the address signal from the voltage controlled variable address frequency oscillator means by a quarter wave length, a synchronous demodulator having one input connected to the output of said delaying means and the other input connected to the output of said filter, and a low-pass filter connected to the output of said synchronous demodulator.

5. The combination as claimed in claim 3 wherein said wave shaping means is an isosceles triangular wave shaping circuit.

6. The combination as claimed in claim 5 wherein said phase error means comprises a synchronous demodulator and a low-pass filter connected to the output of said synchronous demodulator.

References Cited

The following references, cited by the Examiner, are of record in the patented file of this patent or the original patent.

UNITED STATES PATENTS

| | | | |
|---|---|---|---|
| 3,204,240 | 8/1965 | McKay | 250—199 |
| 3,231,822 | 1/1966 | Tillotson | 325—346 |
| 3,383,597 | 5/1968 | Battail | 325—34 |

FOREIGN PATENTS

| | | |
|---|---|---|
| 526,591 | 6/1956 | Canada. |

ALBERT J. MAYER, Primary Examiner